(12) United States Patent
Erickson (10) Patent No.: US 10,773,829 B2
(45) Date of Patent: Sep. 15, 2020

(54) METHOD OF MAKING A PORTABLE PROGRAMMABLE MACHINE

(71) Applicant: The Boeing Company, Chicago, IL (US)

(72) Inventor: Chris J. Erickson, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 74 days.

(21) Appl. No.: 16/238,138

(22) Filed: Jan. 2, 2019

(65) Prior Publication Data

US 2019/0135454 A1 May 9, 2019

Related U.S. Application Data

(62) Division of application No. 15/143,033, filed on Apr. 29, 2016, now Pat. No. 10,196,158.

(51) Int. Cl.
*B64F 5/00* (2017.01)
*B25J 11/00* (2006.01)
(Continued)

(52) U.S. Cl.
CPC .............. *B64F 5/00* (2013.01); *B25J 5/007* (2013.01); *B25J 11/005* (2013.01);
(Continued)

(58) Field of Classification Search
CPC ...... B64F 5/40; B64F 5/30; B64F 5/10; B64F 5/00; B25J 5/007; B25J 11/0085; B25J 11/007; B25J 11/005; B25J 18/04; B25J 18/025; B25J 18/02; B25J 18/007; B25J 19/023; B25J 19/005; B25J 15/0019; B25J 15/0066; B23P 2700/01
See application file for complete search history.

(56) References Cited

U.S. PATENT DOCUMENTS

| 3,760,956 | A | | 9/1973 | Burch |
| 5,138,800 | A | * | 8/1992 | Janusz .................... B23Q 1/48 |
| | | | | 451/11 |

(Continued)

*Primary Examiner* — Jermie E Cozart
(74) *Attorney, Agent, or Firm* — Miller, Matthias & Hull LLP (57) ABSTRACT

A portable programmable machine enhances efficiency and ergonomics associated with conducting otherwise manual operations within confined spaces. A main body supports a programmable telescoping arm configured to extend through an access port to reach a confined space. The arm includes an articulating wrist for holding and manipulating tools for autonomously processing work parts. The machine can also act semi-autonomously to accommodate interventions of an operator for overriding and fine-tuning interaction of a tool with a work part for proper processing of the part. The arm communicates with a computer in the main body for processing numerical data, and the operator may use a reference camera to fine tune any particular process. The machine incorporates multiple processing functions, for example collar swaging, nut running, cleaning, and/or application of sealants, all through an aircraft wing access port. The main body has lockable wheels for securing the main body near the access port.

20 Claims, 7 Drawing Sheets

(51) Int. Cl.
    *B64F 5/10* (2017.01)
    *B64F 5/40* (2017.01)
    *B25J 18/04* (2006.01)
    *B25J 19/02* (2006.01)
    *B25J 5/00* (2006.01)
    *B25J 18/02* (2006.01)
    *B25J 19/00* (2006.01)
    *B25J 15/00* (2006.01)
    *B64F 5/30* (2017.01)
    *B25J 18/00* (2006.01)

(52) U.S. Cl.
    CPC ........ *B25J 11/0075* (2013.01); *B25J 11/0085* (2013.01); *B25J 15/0019* (2013.01); *B25J 15/0066* (2013.01); *B25J 18/02* (2013.01); *B25J 18/025* (2013.01); *B25J 18/04* (2013.01); *B25J 19/005* (2013.01); *B25J 19/023* (2013.01); *B64F 5/10* (2017.01); *B64F 5/40* (2017.01); *B23P 2700/01* (2013.01); *B25J 11/007* (2013.01); *B25J 18/007* (2013.01); *B64F 5/30* (2017.01); *Y10S 901/43* (2013.01)

(56) References Cited

U.S. PATENT DOCUMENTS

| | | | |
|---|---|---|---|
| 5,146,796 A | * | 9/1992 | Mailliet ............... C21B 7/24 374/147 |
| 5,672,044 A | | 9/1997 | Lemelson |
| 5,680,900 A | | 10/1997 | Nguyen et al. |
| 8,651,046 B1 | | 2/2014 | Davancens et al. |
| 2009/0071281 A1 | | 3/2009 | Fisk et al. |
| 2013/0185925 A1 | | 7/2013 | Sarh et al. |
| 2015/0375390 A1 | | 12/2015 | Becroft et al. |

* cited by examiner

METHOD OF MAKING A PORTABLE PROGRAMMABLE MACHINE

RELATED APPLICATION

This application is a divisional of U.S. application Ser. No. 15/143,033, filed Apr. 4, 2016.

FIELD

The present disclosure relates generally to portable autonomous and/or semi-autonomous machines that facilitate automation, and more specifically to using such machines for enhancing manufacturing efficiencies, while reducing ergonomic injury risks often associated with manual operations conducted within confined spaces.

BACKGROUND

Although construction of modern aircraft has generally become more efficient and cost-effective, there are portions of aircraft structures for which manufacturing processes remain challenging. One of these involves completion of physical work within aircraft wing interiors by technicians. The latter is commonly associated with finalizing spar and rib securement via fasteners to wing panels and/or panels within interior portions of wings. Such access, required for swaging of collars and torqueing of nuts to bolts, may also include cleaning of cutting oils from wing panel interiors, and application of sealants to interior portions of aircraft wings. This work has involved technicians having to climb into and maneuver within confined spaces, exerting themselves in ergonomically stressful ways, resulting in occasional sprains, strains, over-extension injuries.

SUMMARY

In accordance with the present disclosure, a portable programmable machine is configured to replicate certain manual operations within confined spaces. The machine has a counterbalanced telescoping arm and a main body that supports functions of the counterbalanced telescoping arm. An unsupported free end of the arm has an articulating wrist configured to hold and manipulate a tool for processing at least a portion of a work part.

In accordance with the present disclosure, the machine is semi-autonomously operable to accommodate intervention by an operator for overriding and fine-tuning interaction of the tool with the work part for processing.

In accordance with the present disclosure, the main body includes an on-board rechargeable battery, a battery-operated power system, and a programmable computer configured to process numerical data and for communication with and control of movements of the arm and wrist, and a reference camera is employed in real-time by the operator to fine tune processing of the work part.

In accordance with the present disclosure, a system defined by a plurality of programmable counterbalanced telescoping arms includes each arm independently configured to replicate a sequence of manual operations within a confined space defined by a cavity on one side of an access port. Each arm acts autonomously, and each is portably supported on a perimeter lip of an associated access port, each arm extending into the confined space.

In accordance with the present disclosure, each arm has a portable main body situated outside of the cavity; i.e. on an opposite side of the access port, and each arm has a free end including an articulating wrist configured to hold and manipulate a tool for processing a work portion situated within the confined space.

In accordance with the present disclosure, each arm is also semi-autonomously operable to accommodate intervention by an operator for overriding and for fine-tuning interaction of the tool with the work part for processing the work portion.

In accordance with the present disclosure, each main body includes an on-board rechargeable battery, a battery-operated power system, and a programmable computer configured to process numerical data for communication with and control of movements of the arm and wrist, and a reference camera is employed in real-time by the operator to fine tune the processing of the work portion.

In accordance with the present disclosure, a method of processing of an interior cavity of an aircraft wing, includes the steps of placing a first telescoping arm through a wing access port, and securing the arm to a perimeter lip of the access port; configuring a main body to support and counterbalance the telescoping arm; forming a wrist on an unsupported end of the arm; configuring the wrist to have an articulating motion, and adapting the wrist to hold and manipulate a set of preselected tools for processing at least a portion of a work part within the cavity.

In accordance with the present disclosure, the method includes additional steps of installing an on-board rechargeable battery, a battery-operated power system, and a programmable computer configured to process numerical data for communication with and control of movements of the arm and wrist; operating the arm semi-autonomously to accommodate intervention by an operator for overriding and fine-tuning interaction of the tool with the work part for processing; and securing a reference camera to the wrist for use by the operator to fine tune the processing of the work part.

The features, functions, and advantages disclosed herein can be achieved independently in various embodiments or may be combined in yet other embodiments, the details of which may be better appreciated with reference to the following description and drawings.

It should be understood that referenced drawings are not necessarily to scale, and that disclosed embodiments are illustrated only schematically. Aspects of the disclosed embodiments may be combined with or substituted by one another, and within various systems and environments that are neither shown nor described herein. As such, it should be understood that the following detailed description is merely exemplary, and not intended to be limiting in either application or use.

DETAILED DESCRIPTION

The following detailed description addresses both apparatus and methods for carrying out the disclosure. Actual scope of the disclosure is as defined by the appended claims.

Figure 1:
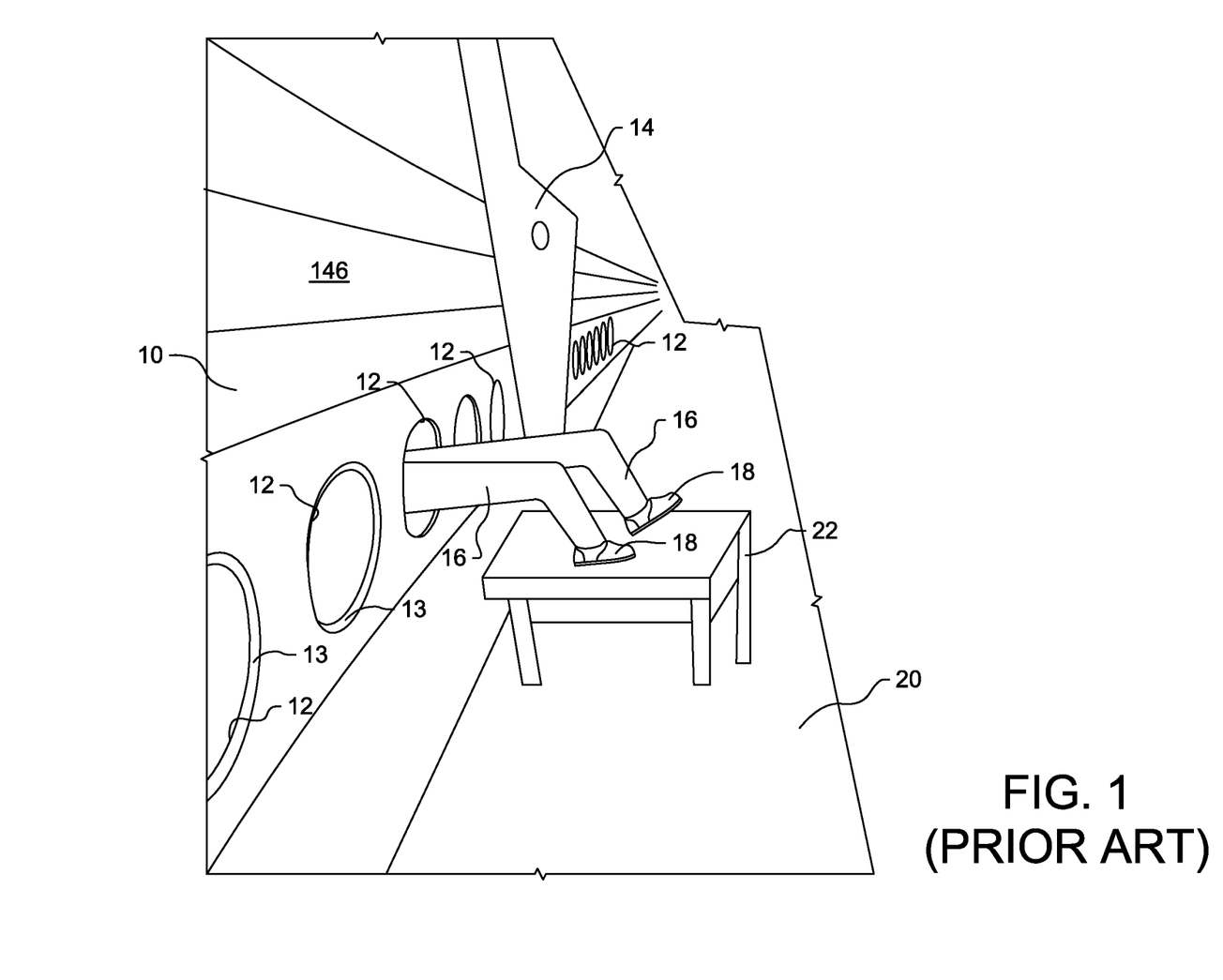
FIG. 1 is a partial perspective view of an aircraft wing, vertically supported on an assembly jig, depicting legs and feet of a technician (not shown) extending from an access port of the wing.

In FIG. 1, a lower panel 146 of an aircraft wing 10 is shown oriented vertically during final processing of its interior portions. The lower panel 146 has a plurality of access ports 12, each incorporating a perimeter lip 13, further described below. A vertical support 14 of an assembly jig (not shown) is configured to retain the aircraft wing 10 vertically, as shown. During final processing, a technician accesses the interior (not shown in FIG. 1) of the wing for various finishing operations to be described. In FIG. 1, legs 16 and feet 18 of the technician are shown extending from an access port 12, over a walkway 20 of the assembly jig, and to a foot rest table 22 positioned on the walkway, while head and torso (neither shown) of the technician are situated within the interior of the wing 10.

Figure 2:
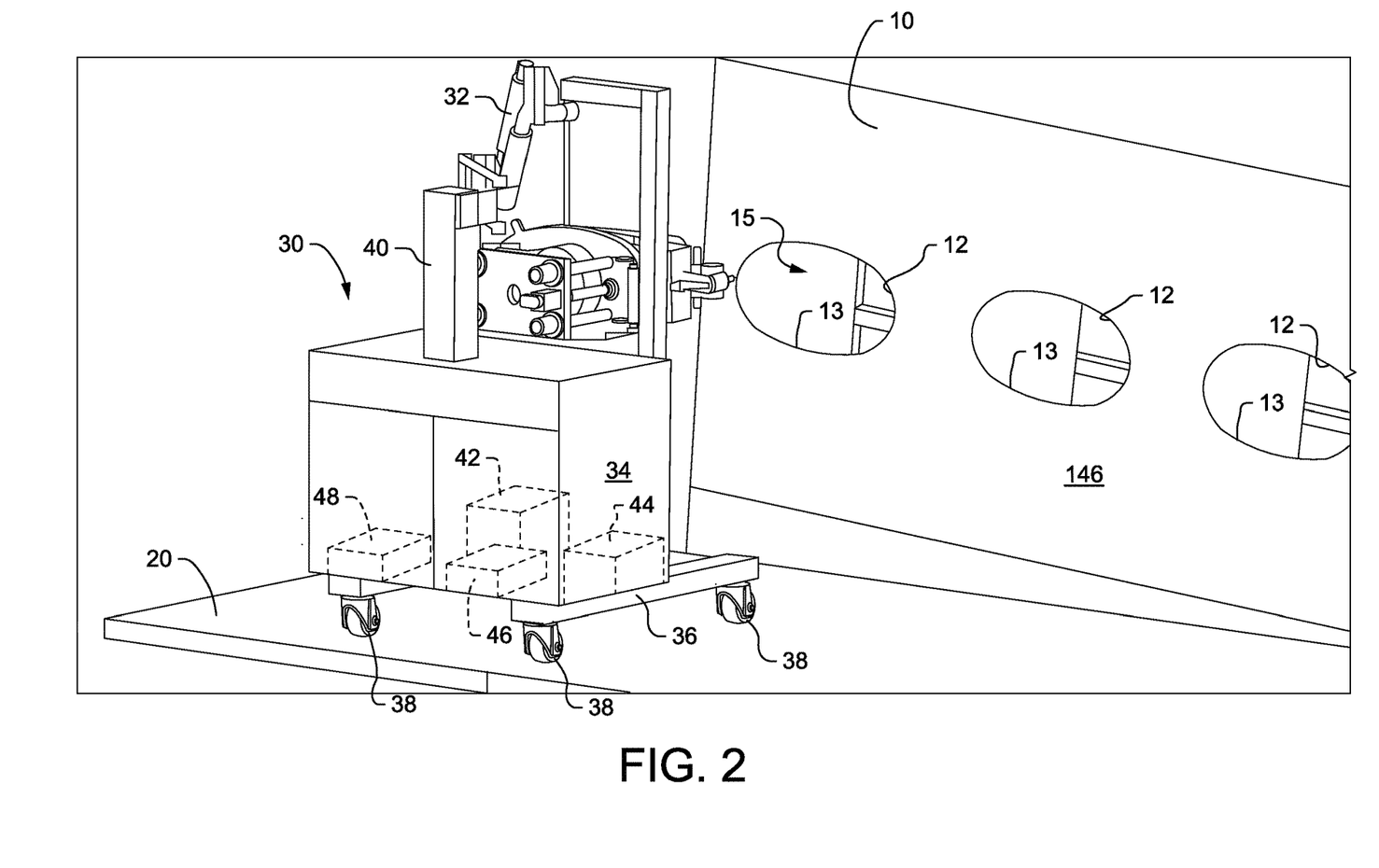
FIG. 2 is a perspective view of a programmable work machine, supported on the assembly jig of FIG. 1, the work machine configured in accordance with the present disclosure.

Referring now to FIG. 2, a programmable work machine 30 is situated on the walkway 20, and is configured for accessing the interior 15 of the wing 10 through the access ports 12, instead of requiring such access by the technician. Thus, instead of having to physically work within the interior 15 of the wing 10 as shown in FIG. 1, the technician, or operator, can remain physically outside of the wing, on the walkway 20, to manage various work machine functions, described below. To facilitate its manipulation, the machine includes a movable arm support 32, a main body, or cart-style base, 34 having a frame 36, and supported by lockable wheels 38 to accommodate portable movement of the work machine 30 along the walkway 20.

For purposes of this disclosure, the interior 15 of the wing 10 (FIG. 2) is defined as a "confined space", to the extent that a technician cannot stand tall or fully erect within such space. As a result, the technician must bend or contort his or her body in order to be able to physically access a work part within the space. Indeed, the wing 10 includes a plurality of "confined spaces" in accordance with this definition.

Stored within the main body 34 is a rechargeable battery 42 configured to render the programmable work machine 30 fully autonomous. Also included within the main body 34 are a computer 44 and a hydraulic pump 46, both powered by the rechargeable battery 42. A compressed air cartridge 48 may also be included for a solvent-based cleaning operation to be described. All of the latter components are shown in phantom, and will be variously further described below.

Figure 3:
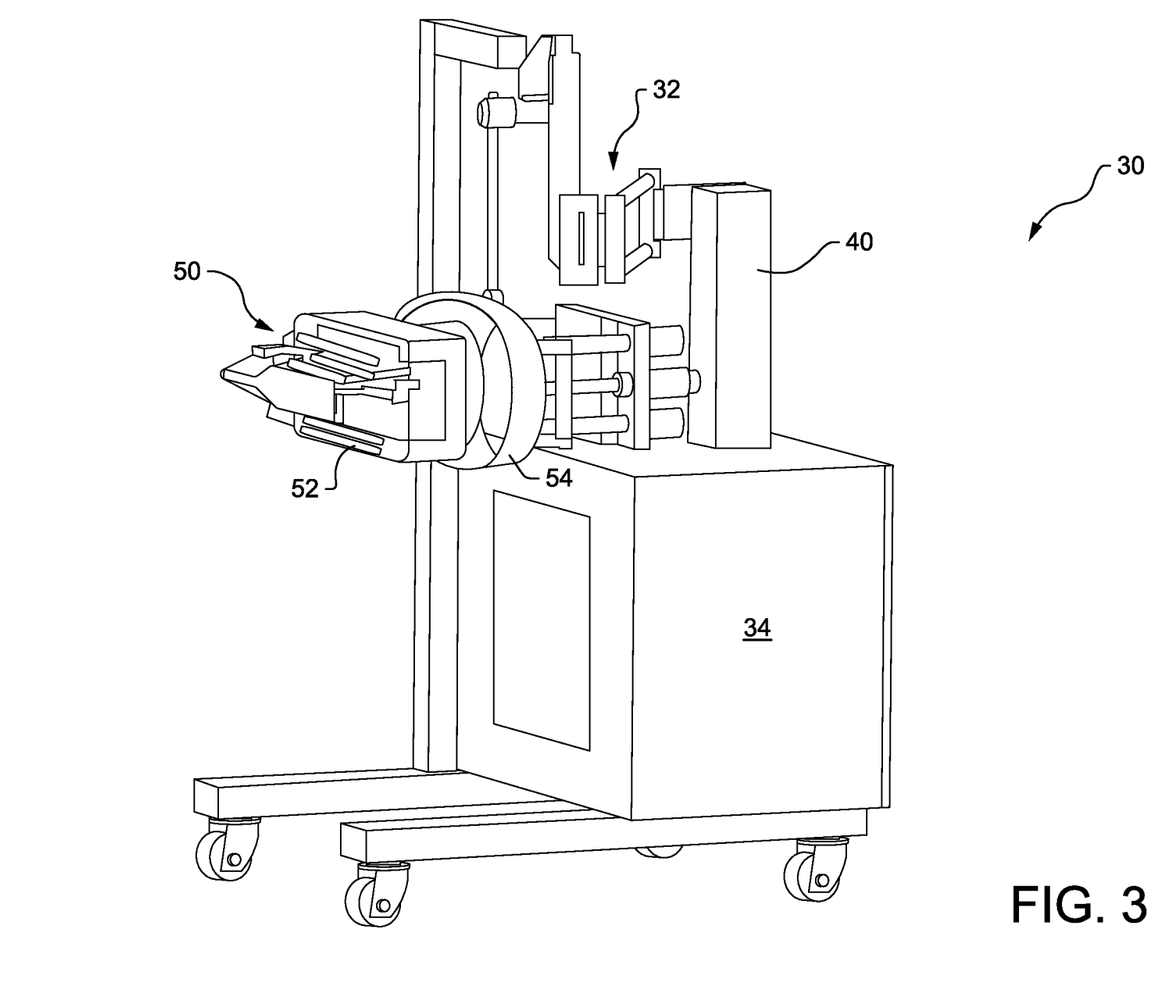
FIG. 3 is another perspective view of the programmable work machine, apart from the assembly jig.
Figure 4:
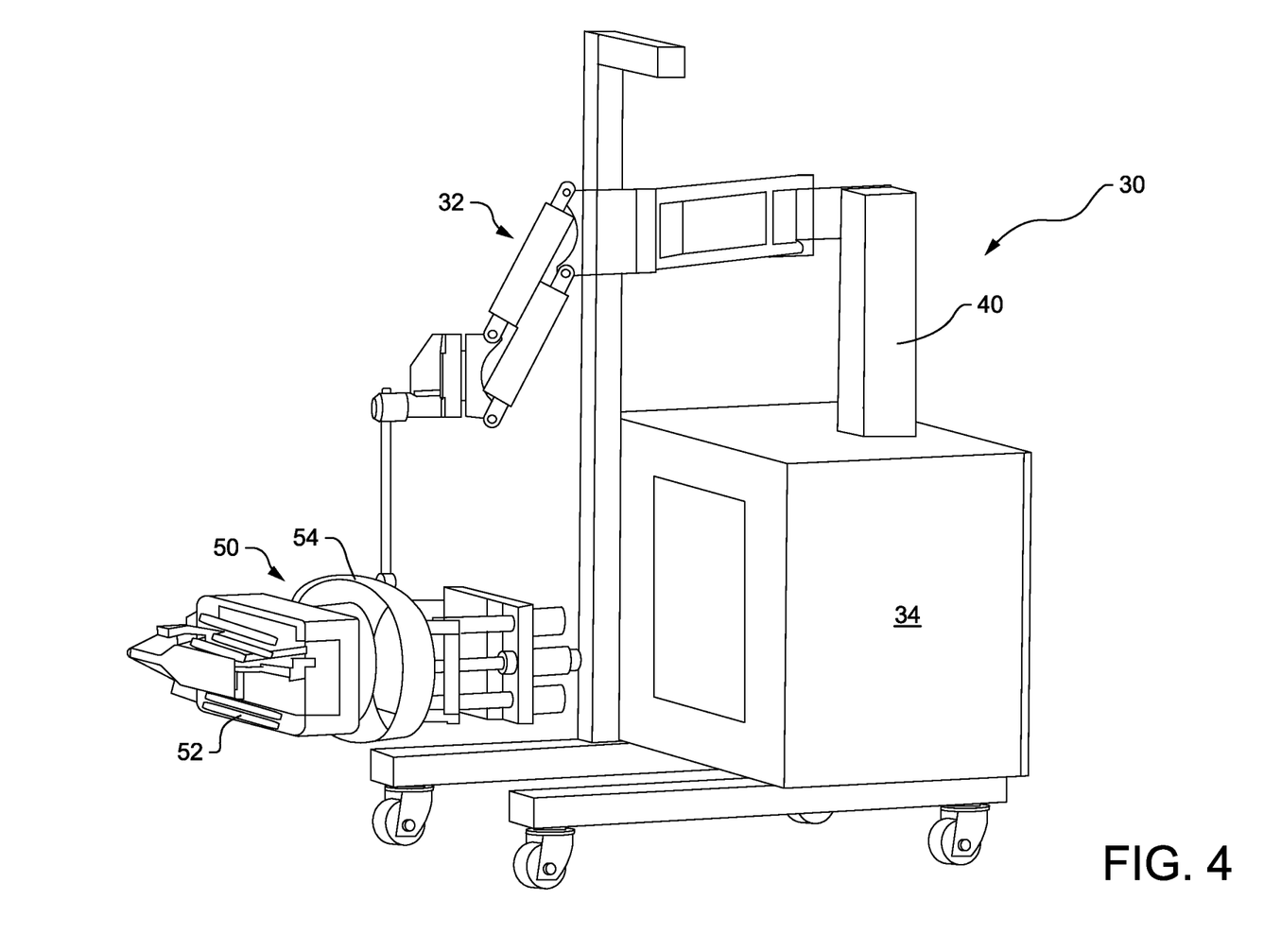
FIG. 4 is yet another perspective view of the programmable work machine.

Referring now also to FIG. 3, the work machine 30 also includes a fixed arm support 40 configured to support the movable arm support 32. Although shown vertically oriented in the arrangement disclosed, the fixed arm support 40 may have alternative configurations, as those skilled in the art will appreciate. The movable arm support 32 is configured to provide a zero gravity-style motion to facilitate placement and support of a portable work module 50 of the work machine 30 in any one of the access ports 12 (FIG. 2). Referring now also to FIG. 4, versatility of movement of the arm support 32 for accommodating placement of the portable work module 50 may be appreciated, as the portable work module 50 is shown in FIG. 4 to be positioned vertically lower with respect to the base 34, as well as laterally spaced from the base 34, as compared to its position in FIG. 3.

Figure 5:
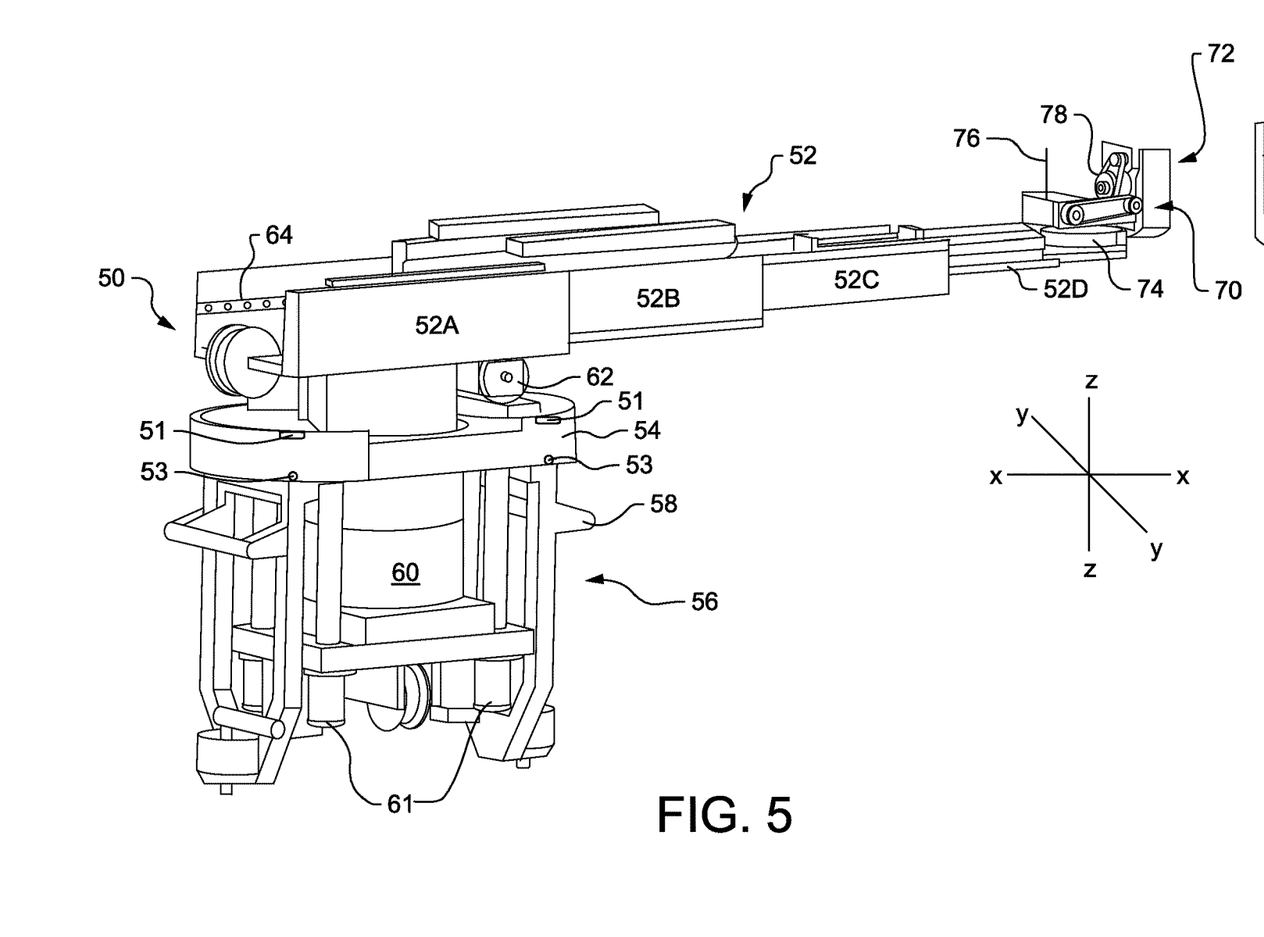
FIG. 5 is a perspective view of an elbow portion and extended telescoping arm of the programmable work machine of FIGS. 2-4, the free end of the arm including an articulable wrist.

Referring now particularly to both FIGS. 3 and 4, the portable work module 50 incorporates a telescoping arm 52, shown in a fully retracted state. A collar 54 is provided as a "locator ring" on the portable work module 50, and is thus configured for securing the work module 50 within an access port 12 for work to be performed within confined spaces of the aircraft wing 10, as described below. Referring now also to FIG. 5, the portable work module 50 is shown with the telescoping arm 52 in a fully extended state, which may be selectively achieved once the work module has been secured within an access port 12. As was noted earlier, the portable work module 50 is supported on a zero gravity arm to facilitate its secure placement within the perimeter lip 13 of any one of the access ports 12 (FIG. 2). For such purpose, the portable work module 50 incorporates an elbow portion 56 having handles 58, as shown, for "zero-gravity" placement by the operator.

Once the collar 54 of the portable work module 50 has been "locked" onto the perimeter lip 13 of an access port 12, the location of the work module 50 is registered in memory of the computer 44 as a reference for physical movements of the telescoping arm to be carried out with respect to that particular operation, as further explained below.

For purposes of locking the collar 54 in place within any particular perimeter lip 13, the collar includes a plurality of spaced locator locks 51 and locator stops 53 about its periphery, as shown in FIG. 5. The operator inserts the collar 54 axially into a perimeter lip 13 with the locator locks 51 retracted. Upon full insertion, any further movement of the collar 54 is arrested by the locator stops 53. The locator locks 51 are then extended to engage the collar 54 securely between the locator locks and stops 51, 53. Registration of the referenced location of the machine 50 is a process that is repeatable every time, and for every access port 12 utilized by the machine 50.

Figure 5A:
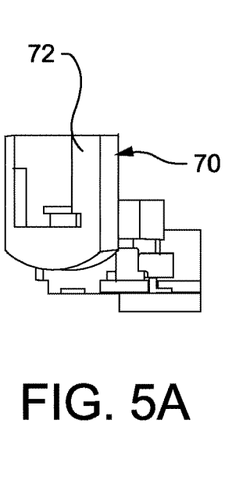
FIG. 5A is a perspective view of the wrist of the telescoping arm, oriented to reveal a face of the wrist, configured for attachment of various tools.

Continuing reference to FIG. 5, pump-powered hydraulic actuators 60 include hydraulic motors 61 for providing computer controlled movements of a telescoping actuator 62 for selectively extending the telescoping arm 52 over a distance of up to several feet. Thus, from its retracted position, shown in FIGS. 3 and 4, various sections, 52A, 52B, 52C, and 52D, of the telescoping arm 52 move along telescoping arm guide rails 64 to accommodate full extension thereof. At the free end, 52D, of the telescoping arm 52 is a wrist 70 which is movable translationally, pivotally, and rotationally along horizontal axes X and Y, as well as vertical axis Z, all orthogonally depicted in FIG. 5. As also depicted in both FIGS. 5 and 5A, a wrist face 72 is configured to receive various tool attachments to be described.

Continuing reference to FIG. 5, selective movements of the wrist 70 are effected by a series of motors, including a yaw rotation motor 74, a pitch rotation motor 76, and a roll rotation motor 78, as will be appreciated by those skilled in the art. Each of the referenced angular movements occurs along at least one of the X, Y, and Z axes of FIG. 5.

Referring now to FIGS. 6-9, various tools may be utilized to conduct various finishing operations within the interior 15 of the aircraft wing 10. For example, referring specifically to FIG. 6, a swage gun 80 is shown secured to the wrist 70. The swage gun 80 may be used to force-fit a collar member to the shank of a pin member to form a permanent connection, for example in the securement of a spar and/or stringer to a wing panel, as those skilled in the art may appreciate. Since the process requires removal of pintails, a pintail extractor 82, collar holding fingers 84, a collar feeder mechanism 88 and a collar and pintail storage bay 90, comprise distinct parts of the swage gun tool assembly. During a swaging operation, a technician may also utilize a vision reference camera 86, shown secured to the swage gun 80, for making minor positioning adjustments, or for overriding a particular computer-based program, for example.

Figure 6:
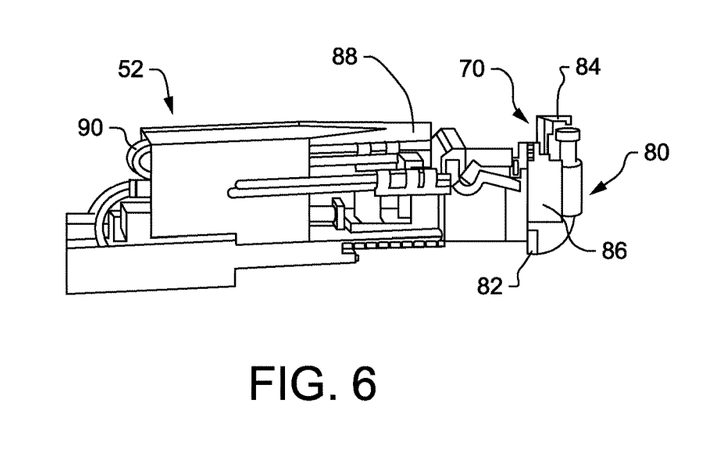
FIG. 6 is a view of the free end of the telescoping arm, depicting a swage gun tool secured to the wrist face.
Figure 7:
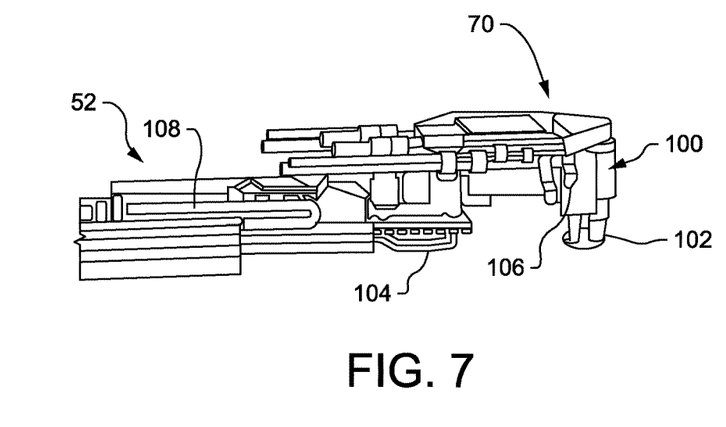
FIG. 7 is another view of the free end of the telescoping arm, depicting a nut driving gun secured to the wrist face.
Figure 8:
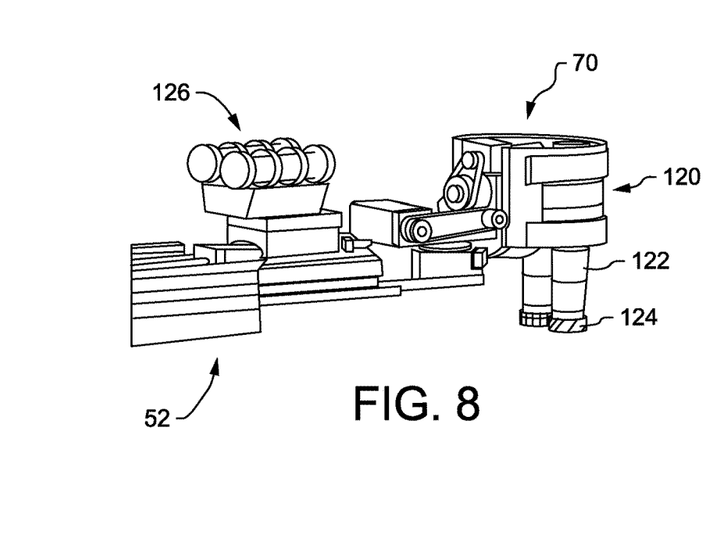
FIG. 8 is another view of the free end of the telescoping arm, depicting a cleaning tool secured to the wrist face.

Referring now to FIG. 7, a nut driving gun 100 is shown secured to the wrist 70, instead of the swage gun 80 (of FIG. 6). The nut driving gun 100 contains nut holding fingers 102, a nut feeder mechanism 104, and a nut storage bay 108, for securing nuts to pre-attached bolts, for example, in various portions of the interior work space. The nut driving gun 100 may also incorporate a vision reference camera 106 for accommodating manual intervention by a technician. Referring now to FIG. 8, a cleaning tool 120 may include a cleaning solvent storage tank 122, a set of active wiping and/or scrubbing brushes 124, and a set of clean/replacement brushes 126. Each of the tools as described may be embodied in modular cartridges that can be interchangeably secured to the wrist face 72 by the technician or operator. Each tool may have multiple functions; for example, the previously noted compressed air cartridge 48 situated within the main body 34 may be used to remove or void cleaning solvent from the cleaning tool 120 upon completion of the cleaning operation, among other functions.

Figure 9:
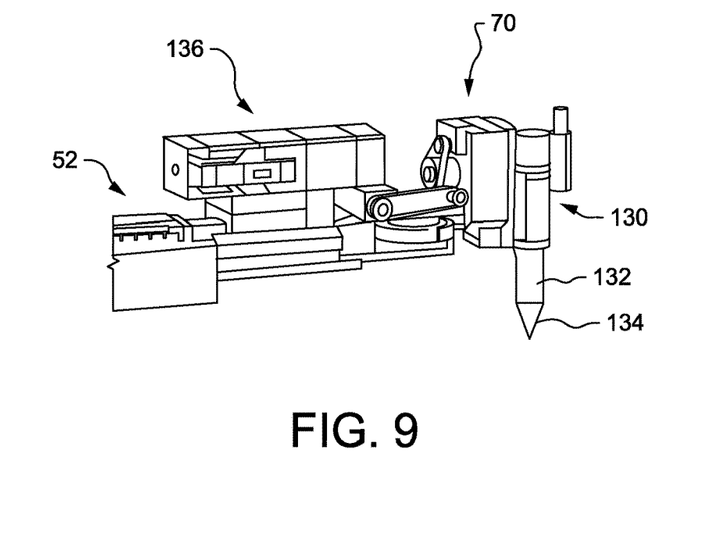
FIG. 9 is another view of the free end of the telescoping arm, depicting a sealant tool secured to the wrist face.
Figure 10:
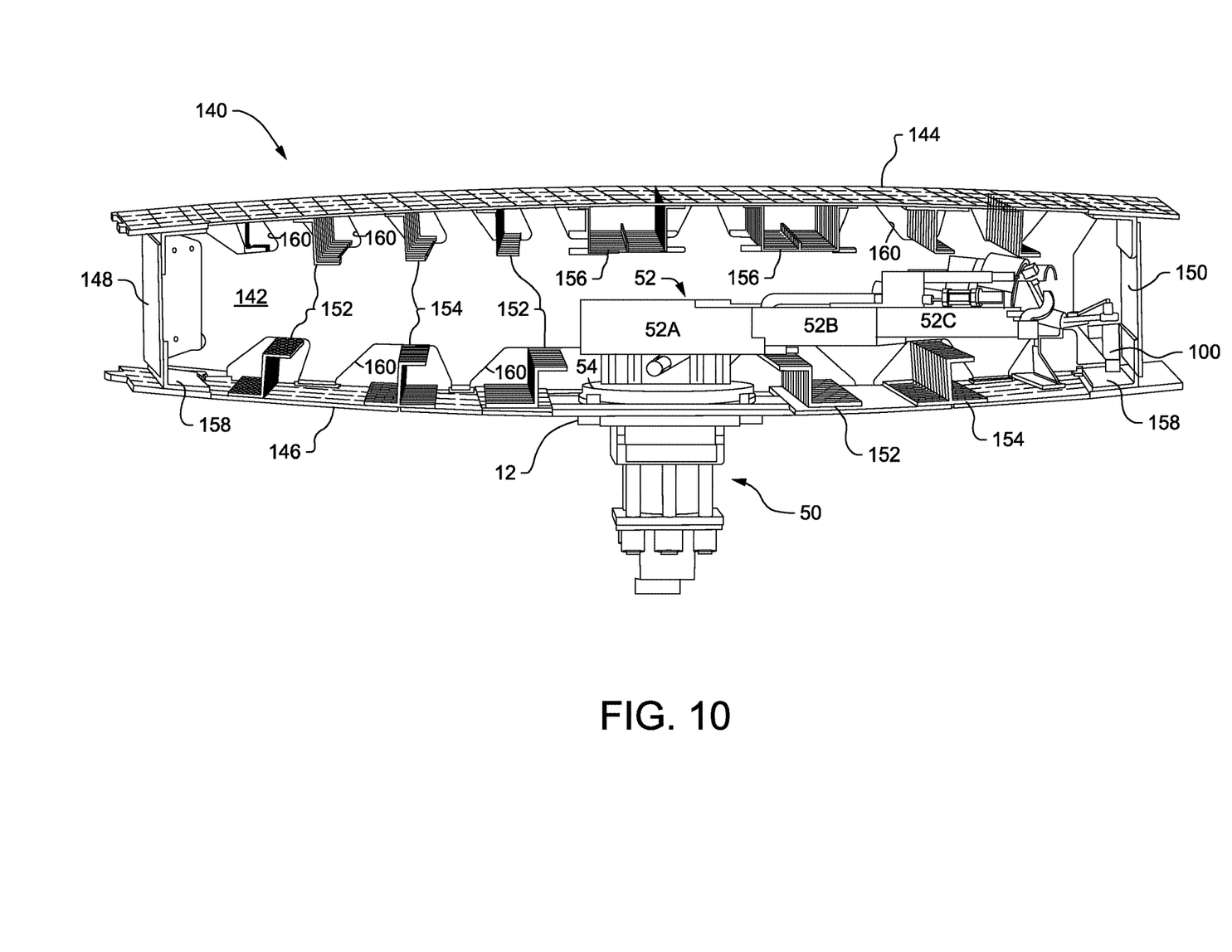
FIG. 10 is a cross-sectional view of a horizontally oriented aircraft wing, depicting an interior wing cavity between a rear and forward spar, with the elbow and telescoping arm portions of the programmable work machine supported within a perimeter lip of an access port of the wing.

Referring now to FIG. 9, after the cleaning tool 120 has removed cutting oils with cleaning solvents, etc., a sealant tool 130 may be used to apply sealant (not shown) over the entire interior surfaces of the aircraft wing 10 (FIG. 2), such as the upper and lower wing panels 144, 146 (FIG. 10). For this purpose, the sealant tool 130 incorporates a sealant nozzle 132 having a nozzle tip 134. A sealant supply tube 136 may be attached to an extended portion of the arm 52, as shown.

All of the described tools are exemplary, only. As such, other tools may be utilized with the programmable work machine 30. In addition, computer programs such as various CAD programs may be replaced by other programs suitable for mechanized operations. Any one of such programs may be utilized for programming the activity of any one of the tools described herein. As disclosed, the programmable work machine 30 can be operated fully autonomously because of its rechargeable battery and self-contained apparatus, including hydraulic pump and compressed air units.

Within the context of this disclosure, the terms "semi-autonomous" and "autonomous" apply principally to the portable work module 50, once locked into place within a perimeter lip 13 of an access port 12. Generally, within the scope of this disclosure, none of the physical movements of the main body 34, programming of various selective work functions, and removal and replacement of the locating collar 54 between access ports 12, are not amenable to autonomous or even semi-autonomous operations.

With respect to the work module 50, if operator intervention is involved to override various aspects of any particular work functions, it can be said that the portable work module 50, hence the machine 30, is being operated "semi-autonomously". However once the machine 30 has been fully installed with the locator collar 54 locked within an access port 12, the machine 30 may then be programmed for at least certain work functions to be carried out fully autonomously.

Finally, referring now to FIG. 10, an aircraft wing cavity 140 is shown in cross section across a single bay, as another example of a confined space, within the interior of an aircraft wing 10, wherein an interior rib 142 extends between rear and forward spars 148, 150, respectively, as shown. As displayed in FIG. 10, the portable work module 50 is shown secured within an access port 12 via the described collar 54, and the telescoping arm 52 is shown partially extended between upper and lower wing panels 144, 146, respectively, within the wing cavity 140.

It will be appreciated that between bays, depending on the particular work process being carried out, an operator may make appropriate changes; e.g. of collar and pintail cartridges, or of nut and/or torqued portions of nut cartridges, and/or removal and installation of new sealant tubes, etc. All of such changes may be made by quick-change cartridges to prepare the work module 50 for access to each successive bay. A nut driving gun 100 is shown positioned for securement of a spar cap 158 of the forward spar 150 to the lower wing panel 146. Within the wing cavity 140 are shown pluralities of stringers utilized for stiffening of the upper and lower wing panels 144, 146.

Thus, Z-shaped stringers 152, T-shaped stringers 154, and U-shaped stringers 156 may be used in selectively and for distinct purposes within the wing cavity 140. For example the U-shaped stringers of 156 provide passageways for protection of electrical and hydraulic lines from fuel contamination. For uninterrupted passage of the elongated stringers between ribs, those skilled in the art will appreciate that the rib 142 includes openings 160, as shown.

This disclosure also provides a method of processing of an interior cavity of an aircraft wing, including placing a telescoping arm having an elbow through a wing access port, and securing the arm via the elbow to a perimeter lip of the access port. A main body, such as a wheeled cart may be fitted with an on-board rechargeable battery, a battery-operated power system such as a hydraulic pump, and a programmable computer configured to process numerical data and for communication with and control of movements of the arm. A wrist may be formed on an unsupported end of the arm, and the wrist may be configured to provide articulating motion, including translation and rolling motion in reference to the X, Y, and Z axes of the arm.

The wrist may be configured to hold and manipulate a set of tools as described above for processing at least a portion of a work part within the cavity. The arm may be operated semi-autonomously to accommodate intervention by an operator for overriding and fine-tuning interaction of the tool with the work part for processing. A reference camera may be secured to the wrist for use by the operator to fine tune the processing of the work part.

The disclosed programmable work machine 30 may have other variations and alternative constructions neither described nor suggested herein. For example, although described in terms of specific structures and components, other configurations and/or other components may be utilized, and in potentially in other environments. Moreover, although the disclosure presents structures in only the shapes and sizes depicted, numerous variations of the disclosed structures may be envisioned for use in the manufacture of alternative embodiments, as may be appreciated by those skilled in the art.

What is claimed is:

1. A method of processing a confined space within a work part, the work part having an access port to provide access to the confined space; the method comprising the steps of:
    configuring a programmable machine to replicate a manual operation within the confined space;
    forming the programmable machine to have a main body;
    forming a portable work module to include a counterbalanced telescoping arm having an unsupported free end with an articulating wrist to hold and manipulate a tool for processing at least a portion of the confined space;
    forming a collar on the portable work module to affix the portable work module to the access port to establish a fixed reference with respect to physical movements of the counterbalanced telescoping arm;
    forming the main body to include a computer configured to process numerical data and for communication with and control of movements of the arm and wrist; and
    semi-autonomously operating the counterbalanced telescoping arm to accommodate intervention by an operator for overriding and fine-tuning interaction of the tool with the work part for processing at least the portion of the confined space.

2. The method of claim 1, wherein the work part is an aircraft wing which includes the access port, and the portable work module is configured to extend through the access port to serially conduct multiple processing functions including collar swaging, nut running, cleaning, and application of sealants within the aircraft wing.

3. The method of claim 1, wherein the main body is portable, and the operation of the portable work module is controlled by the computer.

4. The method of claim 1, further comprising securing a reference camera to the articulating wrist to permit fine tuning of the processing of the work part.

5. The method of claim 1, wherein the main body is lockable in place on a rolling cart.

6. The method of claim 1, wherein the main body further comprises a hydraulic pump.

7. The method of claim 1, further providing a plurality of tools for processing the work part, wherein the tools comprise at least one preselected set of tools from among at least a collar swaging tool, a nut runner tool, a cleaning tool, and a sealing tool.

8. A method of making a system defined by a plurality of programmable counterbalanced telescoping arms, each telescoping arm independently configured to replicate a sequence of manual operations within a confined space on one side of an access port of a work part; the method comprising:
    forming a plurality of the telescoping arms, each telescoping arm configured to act autonomously;
    supporting each telescoping arm on a perimeter lip of a fixed access port to facilitate its extension into the confined space
    providing a portable main body outside of the confined space to support each telescoping arm;
    forming each arm to have a free end including an articulating wrist configured to hold and manipulate a tool for processing at least a portion of the work part within the confined space;
    configuring each arm to operate semi-autonomously to accommodate intervention by an operator for overriding and for fine-tuning interaction of the tool with the work part for processing of the work part; and
    supplying each main body with a computer configured to process numerical data for communication with and control of movements of the arm and wrist.

9. The method of claim 8, further comprising securing a reference camera to the articulating wrist to permit fine tuning of the processing of the work part.

10. The method of claim 8, wherein the main body comprises a cart on wheels selectively lockable in place.

11. The method of claim 8, wherein the tool is a nut runner tool.

12. The method of claim 8, wherein the tool is a collar swaging tool.

13. The method of claim 8, wherein the tool is a cleaner tool.

14. The method of claim 8, wherein the tool is a sealer tool.

15. The method of claim 8, wherein the main body further comprises a compressed air unit.

16. A method of making a portable programmable machine to process a work part containing a confined space accessible through an access port; the method comprising the steps of:
    forming a main body and a portable work module;
    securing the portable work module to the main body;
    providing the portable work module with a counterbalanced telescoping arm;
    forming a collar on the portable work module, and configuring the collar to secure the portable work module to the access port as a fixed reference with respect to physical movements of the telescoping arm;
    configuring the main body to enable operation of the counterbalanced telescoping arm;
    providing an unsupported free end of the arm to have an articulating wrist configured to hold and manipulate a tool for processing at least a portion of the work part;
    operating the portable work module semi-autonomously to accommodate intervention by an operator for overriding and fine-tuning interaction of the tool with the work part for processing; and
    configuring the main body to include a computer configured to process numerical data and for communication with and control of movements of the arm and wrist.

17. The method of claim 16, further comprising securing a reference camera to the articulating wrist to permit fine tuning of the processing of the work part.

18. The method of claim 16, further comprising forming the main body as a cart with wheels, and selectively locking the wheels in place.

19. The method of claim 16, further comprising providing a perimeter lip on the access port.

20. The method of claim 19, further comprising the step of locking the portable work module to the perimeter lip.

* * * * *